Feb. 22, 1966   KIYOSHI IMON   3,236,115
STEPLESS VARIABLE SPEED CHANGE DEVICES
Filed Sept. 26, 1963   6 Sheets-Sheet 1

Feb. 22, 1966  KIYOSHI IMON  3,236,115
STEPLESS VARIABLE SPEED CHANGE DEVICES
Filed Sept. 26, 1963  6 Sheets-Sheet 3

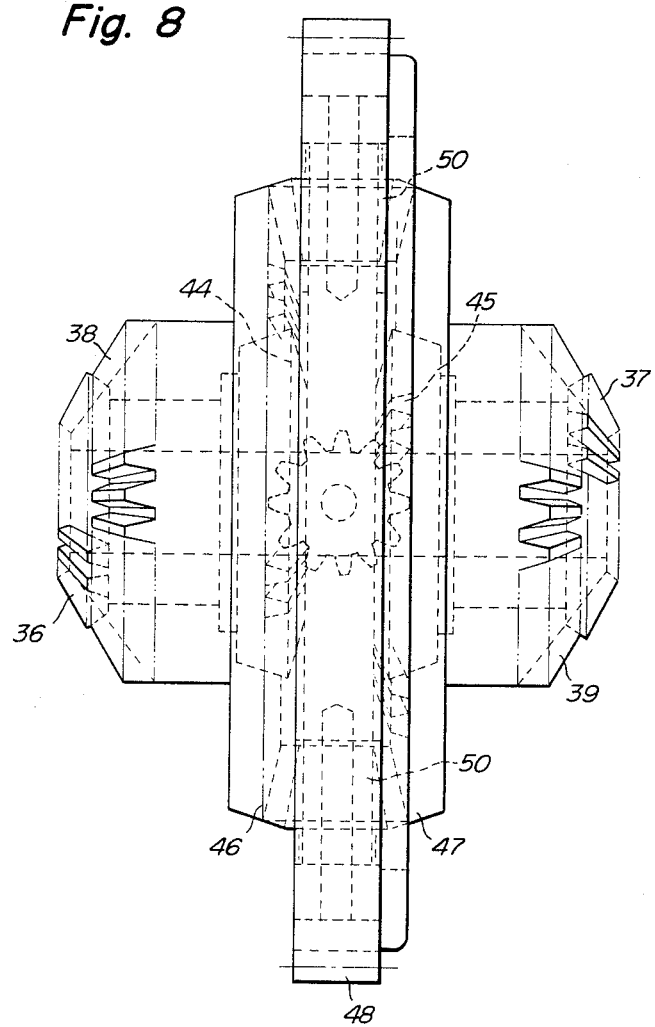

3,236,115
STEPLESS VARIABLE SPEED CHANGE DEVICES
Kiyoshi Imon, 2 Imafuku-Kita-3-chome, Joto-ku,
Osaka, Japan
Filed Sept. 26, 1963, Ser. No. 311,701
Claims priority, application Japan, Sept. 29, 1962,
41,998/62
2 Claims. (Cl. 74—393)

The present invention relates to a novel stepless variable speed change device which is composed of a combination of toothed wheels.

Conventional stepless variable speed change devices of mechanical transmission type utilize the frictional transmission between the input and output elements, in which slip generally takes place depending on the magnitude of load, resulting in unreliable transmission.

The present invention intends to obviate such difficulty of the conventional stepless variable speed devices and has for its object to provide a novel stepless variable speed change device of all-gear type which insures smooth and unobstructed transmission without any slip.

According to the invention, there is provided a stepless variable speed change device comprising an input shaft, a central shaft geared to said input shaft, an output shaft operatively connected to said central shaft, two gears loosely mounted on said central shaft opposite to each other for free rotation thereabout, said gears being provided with teeth of the same circumferential pitch spirally disposed on the opposing faces thereof, a plurality of shafts radially disposed in pairs about said central shaft between said spiral gears so as to extend parallelly with the toothed surfaces of said spiral gears, a plurality of gears slidably mounted on said radial shafts for unitary rotation therewith, said gears of each pair being in meshing engagement with the corresponding spiral gear, a central gear mechanism disposed about said central shaft between said pairs of radial shafts for adjusting varying rotational speeds of said radial shafts to provide a mean rotational speed, said central gear mechanism including a central gear loosely mounted on said central shaft for rotation at said mean rotational speed, and means for providing sliding movement of said gears on said radial shafts for varying the positions of engagement of said gears with said spiral gears as desired, whereby a rotation at a predetermined speed given to said spiral gears can be varied to a desired rotational speed and taken out of said central gear.

The stepless variable speed change device of the invention with the feature of smooth and stepless variable transmission can be most successfully adapted for incorporation in machine tools such as lathes, milling machines and drilling machines. For example, the device may be applied to a tool post of a lathe. In this case, as the tool post moves from a peripheral portion towards a central portion of a workpiece during face cutting operation, corresponding rotations from a high to a low speed will be imparted to a main spindle. This is quite effective for improvement of efficiencies and reduction of labor, as will be readily understood. The stepless variable device of the invention can be equally effectively applied to industrial machines, such as machines for construction works and mines, conveyors or air blowers.

There are other objects and particularities of the invention which will become obvious from the following description with reference to the accompanying drawings, in which:

FIG. 8 is an enlarged side elevational view of the central gear mechanism forming a speed regulating part of the device;

Figure 1:
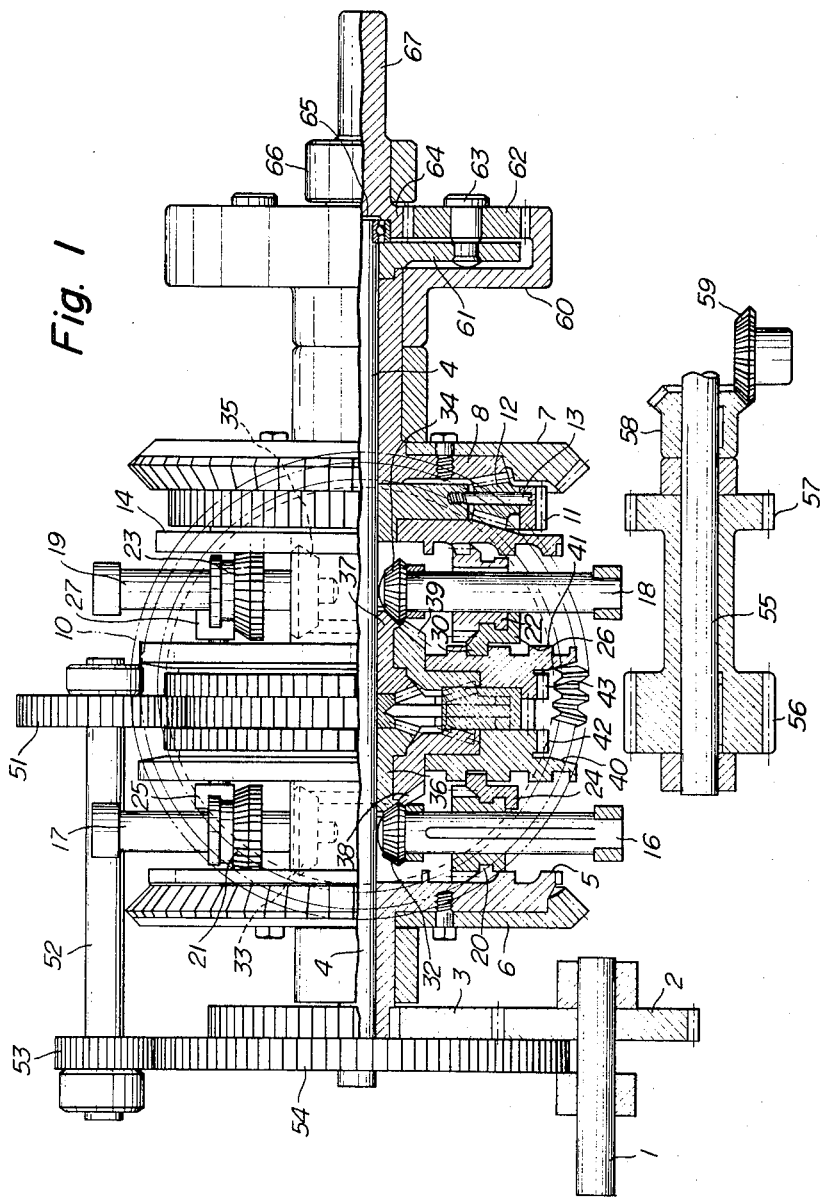
FIG. 1 is a side elevational view of a preferred embodiment of a stepless variable change speed device of the invention, with parts in section.
Figure 2:
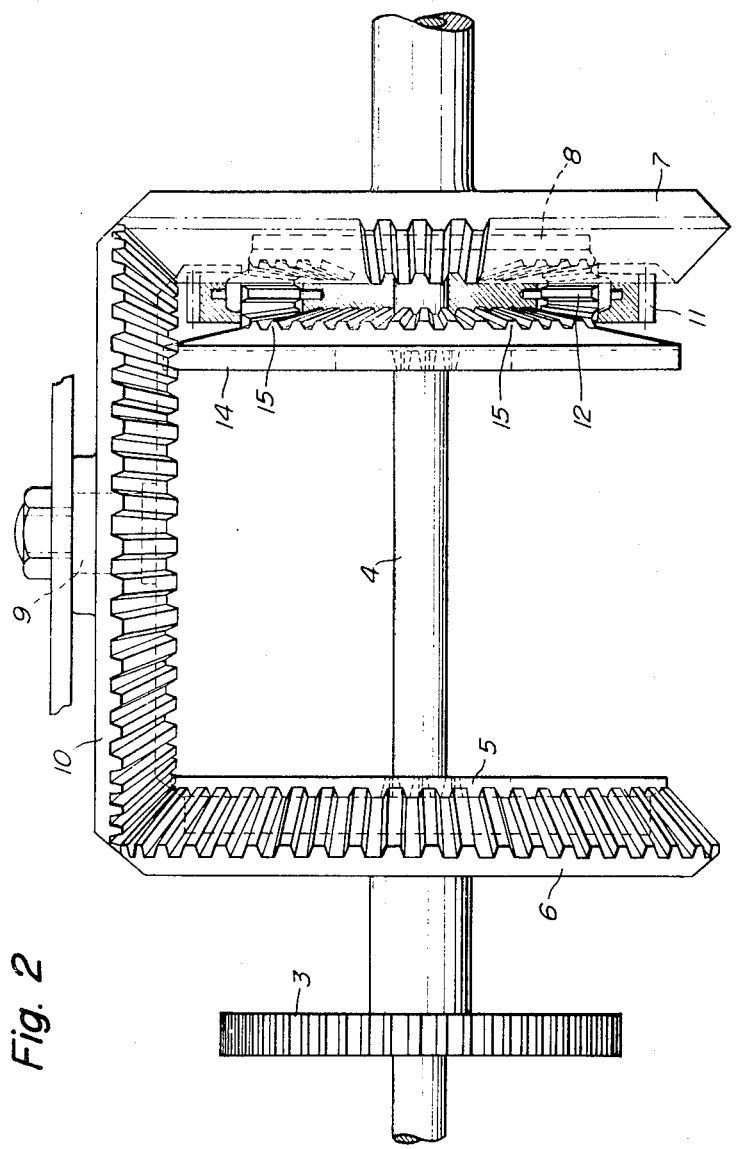
FIG. 2 is a plan view showing an arrangement of two spiral gears and bevel gears cooperating therewith for conjoint operation of said spiral gears.
Figure 3:
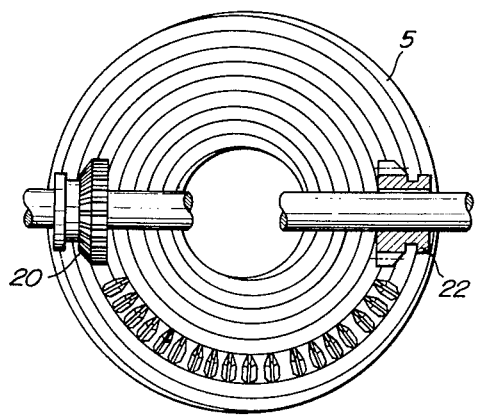
FIG. 3 is a front elevational view of one of the spiral gears which is shown as engaged by one of two gears mounted on radial shafts.
Figure 4:
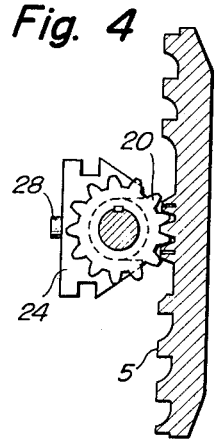
FIG. 4 is a side elevational view of the spiral gear of FIG. 3.

Now referring to FIG. 1, there is shown a preferred embodiment of a stepless variable speed change device of the invention which comprises an input shaft 1 carrying thereon a gear 2. The gear 2 is in meshing engagement with a gear 3 which is keyed to a boss of a spiral gear 5 loosely mounted on a central shaft 4 for free rotation thereabout. As best shown in FIG. 3, the spiral gear 5 has on its side face a succession of teeth of the same circumferential pitch arranged in the form of a vortex, and has a bevel gear 6 firmly secured on the back face thereof as shown in FIG. 2.

At a symmetrical position on the central shaft 4 with respect to the bevel gear 6 and axially aligned therewith, there is provided a bevel gear 7 of the same diameter as the bevel gear 6. The bevel gear 7 is firmly secured on the back face of a bevel gear 8 which is loosely mounted on the central shaft 4 for free rotation thereabout, as shown in FIG. 2.

The bevel gears 6 and 7 are engaged by a bevel gear 10 disposed therebetween for rotating the bevel gears 6 and 7 in opposite directions of rotation relative to each other. The bevel gear 10 is mounted on a shaft 9 which is disposed perpendicular to the central shaft 4. A spur gear 11 is loosely mounted on the central shaft 4 at a position inwardly of the bevel gear 8, and has at least two recesses radially and symmetrically bored therein to receive in each of the recesses a small bevel gear 12. Each bevel gear 12 is radially supported by a shaft 13 and in meshing engagement with the bevel gear 8. Inwardly of said spur gear 11, a spiral gear 14 is loosely mounted on the central shaft 4 in opposition to said spiral gear 5. The spiral gear 14 likewise has a succession of teeth arranged in the form of a vortex in the same direction as that of the spiral gear 5 and has the same diameter as the latter. As will be seen in FIG. 2, the teeth of the spiral gears 5 and 14 face each other in spaced apart relation. A bevel gear 15 is formed on the back or outside face of the spiral gear 14 and in meshing engagement with the bevel gears 12.

Between the spiral gears 5 and 14, there are provided shafts 16, 17, 18 and 19 which are radially disposed in pairs about the central shaft 4 at positions opposite to each other as shown in FIG. 1. The shafts 16 and 17 are disposed parallel and adjacent to the toothed surface of the spiral gear 5, while the shafts 18 and 19 are disposed parallel and adjacent to the toothed surface of the spiral gear 14. The shafts 16, 17, 18 and 19 are suitably supported at outer ends by bearings. Gears 20, 21, 22 and 23 having a peculiar tooth profile are mounted on the radial shafts 16, 17, 18 and 19, respectively, so as to be slidable along elongated key ways formed on the shafts and capable of unitary rotation therewith. The slidable gears 20 and 21 are in meshing engagement with the spiral gear 5 as shown in FIG. 3, while the gears 22 and 23 are in engagement with the spiral gear 14.

The slidable gears 20, 21, 22 and 23 have slots formed therein in which sliders 24, 25, 26 and 27 are made to engage, respectively. The sliders 24, 25, 26 and 27 have pins 28, 29, 30 and 31 projecting from their back faces, respectively.

Bevel gears 32 and 34 are integrally formed at the inner ends of the radial shafts 16 and 18 for meshing engagement with bevel gears 36 and 37 loosely mounted on the central shaft 4, respectively. Bevel gears 33 and 35 are integrally provided on the radial shafts 17 and 19 at a position slightly outward of the inner ends of said shafts and are in meshing engagement with bevel gears 38 and 39 loosely mounted in the bevel gears 36 and 37, respectively. Discs 40 and 41 are also loosely mounted on the bevel gears 38 and 39, respectively, for free rotation thereabout. The discs 40 and 41 have spiral grooves of the same radial pitch cut on the outside faces, and the direction of the spiral of the disc 40 is the same as that of the spiral gears 5 and 14, while the direction of the spiral of the disc 41 is made opposite to that of the gears 5 and 14.

Figure 5:
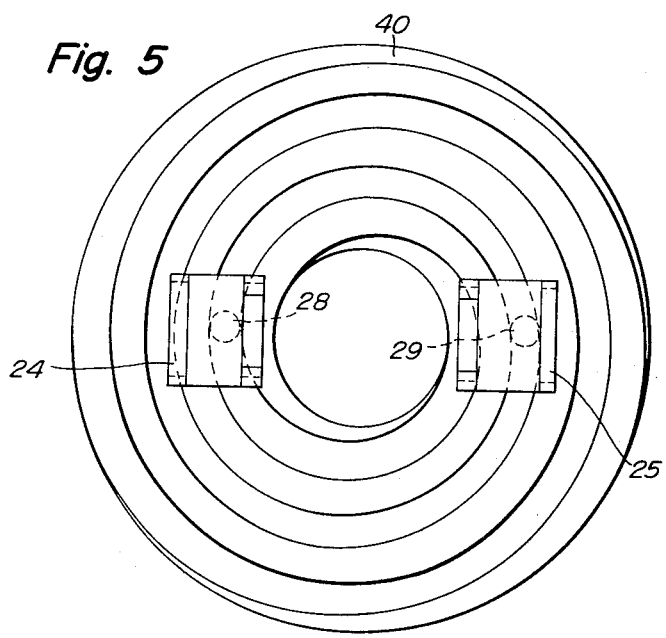
FIG. 5 is a front elevational view of a disc with spirally cut grooves.
Figure 7:
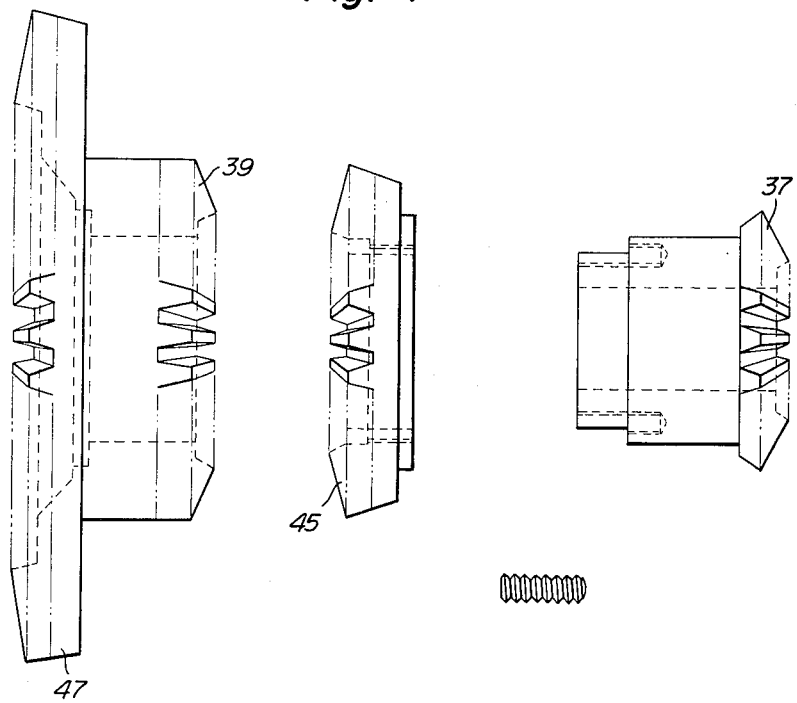
FIG. 7 is an explanatory view showing the structure and arrangement composite bevel gears included in a central gear mechanism of the device of the invention.

As shown in FIG. 5, the respective pins 28 and 29 of the sliders 24 and 25 fit in the spiral grooves of the disc 40, while the respective pins 30 and 31 of the sliders 26 and 27 fit in the spiral grooves of the disc 41. The discs 40 and 41 have spur gears 42 and 43 integrally formed on their back or inside faces, respectively. The bevel gears 36, 37, 38 and 39 have bevel gears 44, 45, 46 and 47 integrally formed on the back sides thereof. Preferably, the bevel gears 37 and 45 are separately fabricated and fitted in the axial bore formed in the composite bevel gear composed of the bevel gears 39 and 47, then secured in a unitary structure as shown in FIG. 7. As for the bevel gears 36 and 44, the same procedure can be followed for fitting them in the composite bevel gear composed of the gears 38 and 46.

Figure 6:
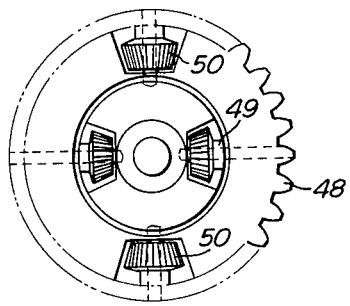
FIG. 6 is a front elevational view of a central spur gear.
Figure 9:
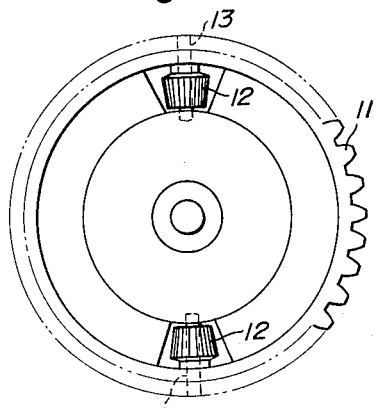
FIG. 9 is a front elevational view of a spur gear which is adapted to be engaged by a speed varying means.
Figure 10:
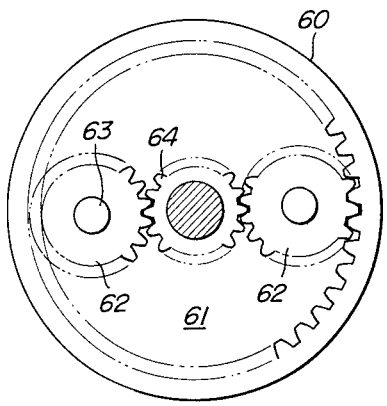
FIG. 10 is a front elevational view of a planetary gear mechanism connected to an output shaft of the device.

Between the bevel gears 36 and 37, a spur gear 48 is loosely mounted on the central shaft 4, as shown in FIG. 8. The spur gear 48 is suitably excavated at a plurality of places so as to radially and pivotally support opposing pairs of small bevel gears 49 and 50 by means of radial pins, as shown in FIG. 6. The pair of gears 49 are in engagement with said bevel gears 44 and 45, while the pair of gears 50 are in engagement with said bevel gears 46 and 47.

The central spur gear 48 is in meshing engagement with a spur gear 51 mounted on one end of a shaft 52 which is supported parallelly with the central shaft 4. A spur gear 53 is secured on the other end of the shaft 52 and is in engagement with a spur gear 54 keyed to the end of the central shaft 4 on the input shaft side.

A shaft 55 is disposed in parallel with the central shaft 4 and has spur gears 56 and 57 firmly secured thereon. The gear 56 is in meshing engagement with both of the spur gears 42 and 43 provided on the back faces of the spirally grooved discs 40 and 41, while the gear 57 is in engagement with the spur gear 11. A bevel gear 58 is secured on one end of the shaft 55 and is in engagement with a bevel gear 59 to which a manipulating handle is operatively connected.

An internal gear 60 is firmly secured on an extension of the boss of the bevel gear 8 which is freely mounted on the other end of the central shaft 4. A disc 61 is firmly secured on the central shaft 4, and planet gears 62 are rotatably supported on the disc 61 by means of pins 63 for meshing engagement with the gear 60. Centrally of the planetary gearing, there is disposed a sungear 64 which is integrally formed with a shaft 67 supported by bearings 65 and 66. The shaft 67 constitutes the output shaft of the stepless variable change speed device of the invention.

The change speed device with the above arrangement operates in the following manner. When the driving shaft 1 is rotated, the spiral gear 5 and the bevel gear 6 are rotated through gears 2 and 3. The bevel gear 6 in turn rotates the bevel gear 10 supported by the shaft 9 disposed perpendicularly with respect to the central shaft 4, and the bevel gears 7 and 8 are rotated in the direction opposite to the direction of rotation of the bevel gear 6. The bevel gears 12 mounted in the spur gear 11 are rotated by the bevel gear 8 and in turn rotate the spiral gear 14 in the same direction and at the same speed with the spiral gear 5.

The two spiral gears 5 and 14 have their teeth arranged in succession in the form of a vortex of the same pitch and in the same direction, and the adjacent teeth are spaced apart the same circumferential pitch. Further, the spiral gears 5 and 14 are loosely and coaxially mounted on the central shaft 4 with their teeth facing towards each other. Due to such relative positions of the spiral gears 5 and 14, the pair of slidable gears 21 and 23 are completely disengaged from the spiral gears 5 and 14, when the two pairs of slidable gears 21 and 23, and 20 and 24 are spaced apart a same distance from the central shaft 4 and the other pair of slidable gears 20 and 22 are in complete engagement with the spiral gears 5 and 14.

Since the row of the teeth of each spiral gear is arranged in the form of a vortex, the radial shafts 16, 17, 18 and 19 are rotated at different rotational speeds depending on the positions they occupy on the spiral gears 5 and 14. The differential rotations of the radial shafts 16, 17, 18 and 19 are transmitted to the respective bevel gears 36, 38, 37 and 39 where the speed differential is suitably adjusted to a mean rotational speed which is transmitted to the central spur gear 48. The rotation of the spur gear 48 is subsequently transmitted to the central shaft 4 through the shaft 52, and then taken out by the output shaft 67 through the planetary gearing.

As will be readily known, the rotational speed of the central spur gear 48 can vary according to the distances of the slidable gears 20, 21, 22 and 23 from the central shaft 4. The variation of the distances of the slidable gears from the central shaft 4 can be readily attained by the manipulation of the operating handle connected to the bevel gear 59. The rotation of the bevel gear 59 rotates the bevel gear 58, hence the spur gear 56 coaxially mounted on the shaft 55, to thereby rotate the spur gears 42 and 43, hence the discs 40 and 41. Then, the sliders 24, 25, 26 and 27 fitted in and guided by the spiral grooves of the discs 40 and 41 are moved to urge the corresponding slidable gears 20, 21, 22 and 23 radially inwardly or outwardly depending on the direction of rotation of the operating handle. Thus, it will be known that the rotational speed of the spur gear 48 can be varied as desired.

Simultaneously with the rotation of the discs 40 and 41 by the spur gear 56, the spur gear 11 is also rotated by the gear 57. This is in order to regulate the relative positions of the spiral gears 5 and 14 to adapt themselves to the new positions of the slidable gears 20, 21, 22 and 23.

From the foregoing description, the novel change speed device of the invention is quite effective for stepless variation of speed to be transmitted to the output shaft without any slip and eliminates the prior difficulty which has been frequently encountered by the conventional devices of frictional transmission type.

What is claimed is:

1. A stepless variable change speed device comprising an input shaft, a central shaft geared to said input shaft, an output shaft operatively connected to said central shaft, two gears loosely mounted on said central shaft opposite to each other for free rotation thereabout, said gears being provided with teeth of the same circumferential pitch spirally disposed on the opposing faces thereof, a plurality of shafts radially disposed in pairs about said central shaft between said spiral gears so as to extend parallel to the toothed surfaces of said spiral gears, a plurality of gears slidably mounted on said radial shafts for unitary rotation therewith, said gears of each pair being in meshing engagement with the corresponding spiral gear, a central gear mechanism disposed about said central shaft between said pairs of radial shafts for adjusting varying rotational speeds of said radial shafts to provide a mean rotational speed, said central gear mechanism including central gear loosely mounted on said central shaft for rotation at said mean rotational speed, and means for providing sliding movement of said gears on said radial shafts for varying the positions of engagement of said gears with said spiral gears as desired, whereby a rotation at a predetermined speed given to said spiral gears can be varied to a desired rotational speed and taken out of said central gear.

2. A stepless variable change speed device according to claim 1, in which said means for providing sliding movement of said gears on said radial shafts comprise two rotatable discs disposed in opposition to each other on said central shaft and arranged to be engaged by an actuating means, said discs being provided with spirally cut grooves on the opposed faces thereof in which sliders of said gears are fitted and guided on said radial shafts.

References Cited by the Examiner
FOREIGN PATENTS 993,412    7/1951    France.

DON A. WAITE, *Primary Examiner.*